United States Patent [19]

Furley et al.

[11] Patent Number: 4,540,013

[45] Date of Patent: Sep. 10, 1985

[54] FIRE RESPONSIVE STEM RETENTION APPARATUS

[75] Inventors: Richard G. Furley, Stroud, England; John H. Fowler, Spring, Tex.

[73] Assignee: Smith International, Inc., Newport Beach, Calif.

[21] Appl. No.: 541,451

[22] Filed: Oct. 13, 1983

[51] Int. Cl.³ .............................................. F16K 17/38
[52] U.S. Cl. ....................................... 137/75; 169/19; 169/42; 220/89 B; 251/330
[58] Field of Search .................... 137/72, 75; 251/330; 169/19, 42; 220/89 B, 88 R

[56] References Cited

U.S. PATENT DOCUMENTS

| | | | |
|---|---|---|---|
| 2,817,349 | 12/1957 | Seaver | 137/75 |
| 3,659,624 | 5/1972 | Kelly et al. | 137/72 X |
| 4,307,745 | 12/1981 | McGee | 137/72 |

FOREIGN PATENT DOCUMENTS

| | | | |
|---|---|---|---|
| 673810 | 3/1939 | Fed. Rep. of Germany | 137/75 |
| 1218769 | 1/1971 | United Kingdom | 137/75 |

Primary Examiner—Arnold Rosenthal
Attorney, Agent, or Firm—Ned L. Conley; David Alan Rose; William E. Shull

[57] ABSTRACT

A fire responsive stem retention apparatus for a non-rising stem valve including an outer hollow sleeve secured to the top of the valve bonnet around the valve stem. An inner cap is received in the outer hollow sleeve and closely fitted therewithin, and houses upper and lower stem bearings therein. The inner cap has a shoulder which provides an upper support for the upper stem bearing. Under normal environmental conditions, the inner cap is sweated to the outer sleeve with a thin layer of fusible material. The upper bearing and stem are prevented from moving upward by the shoulder on the inner cap, and an annular shoulder on the stem is prevented from engaging a backseat in the bonnet. Under fire conditions, the thin layer of fusible material melts rapidly, freeing the inner cap from the outer sleeve and permitting the stem to rise until the annular shoulder on the stem engages the backseat in the bonnet. A screw in the inner cap rides in a slot in the outer sleeve, preventing removal of the inner cap from the sleeve.

16 Claims, 3 Drawing Figures

FIRE RESPONSIVE STEM RETENTION APPARATUS

FIELD OF THE INVENTION

This invention relates generally to valves, and more particularly to a fire responsive stem retention apparatus for a non-rising stem valve which under normal environmental conditions allows operation of the valve with no backseating of the valve stem and, under fire conditions, is actuated in response to extreme heat to allow backseating of the stem in the valve bonnet.

BACKGROUND ART

Fire has always been a hazard to oil and gas operations, and it is therefore essential that equipment used in the exploration for, and production of, oil and gas maintain its functional integrity under fire conditions to avoid worsening or proliferation of the fire. Valves are included among the equipment that sometimes becomes subjected to fire conditions and must, therefore, meet the requirements of the "API Recommended Practice Fire Test for Valves" of the American Petroleum Institute, referenced API RP6F, Second Edition, December, 1980. In summary those requirements include, in the case of a 5000 psi rated valve, for example, maintaining a 3750 psi (258.6 bar) upstream pressure in a test flame of between 1400°–1600° F. (761°–871° C.), a 5000 psi (345 bar) upstream pressure after cooling, and the ability to operate the valve against full rated pressure after it has cooled. A minimal amount of through and external leakage is permitted by the API RP6F requirements. Although the API RP6F criteria have proved beneficial in the design and development of fire-resistant valves, some companies, notably those within the Shell Group, expressed the belief that the fire test defined in API RP6F does not reflect the true temperatures experienced during an oil or gas fire. Those companies have also been concerned over the leakage permitted in the API RP6F test. A more stringent fire test was therefore developed by the Shell Group for qualification of fire-resistant wellhead equipment, including valves. This more stringent fire test is referred to as the API RP6F-"Improved" test, and is meeting with wide acceptance among both manufacturers and users of wellhead equipment as an aid in designing and testing of such equipment to improve its fire-resistant characteristics. The API RP6F-"Improved" fire test includes, for example, subjecting the equipment to a higher flame temperature of 2000° F. (1100° C.) than specified in API RP6F, and eliminating the allowable through and external leakage under prescribed test conditions. The API RP6F-"Improved" fire test is intended to be more severe than the actual temperatures experienced in a typical well fire. For a discussion of some recent efforts in design of fire-resistant wellhead equipment, including valves, and a comparison of the principal fire test conditions for the API RP6F and API RP6F-"Improved" procedures, reference may be had to "Development of Fire-Resistant Wellhead and Christmas Tree Equipment," by R. Hartley, P. Hamer and R. van Dort, Offshore South East Asia 82 Conference, February, 1982, and "Fire Resistant Wellhead Equipment for Statfjord 'B' Platform," by Allen Millmaker and Manfred Leiser, Paper OTC 4371, Offshore Technology Conference, May, 1982.

In a conventional through-conduit, non-rising stem gate valve, the valve body has a flow way through which the pipeline fluids pass and a chamber intersecting the flow way inside the valve body. A gate is disposed within the chamber for reciprocation across the flow way where, in the upper position, for example, a flow port in the gate registers with the flow way to permit line fluids to flow through the valve, and in the lower position the gate blocks the flow through the flow way. The gate is reciprocated within the valve chamber by mechanical means, such as a hand wheel mounted on a stem connected to the gate, causing the gate to move across the flow way to open and close the valve. The gate is reciprocated on and sealed against a gate seat in the valve chamber, and the gate seat is mounted in and sealed with respect to the valve body. A bonnet closes the stem opening of the valve chamber. Stem packing seals between the stem and bonnet.

Under fire conditions, such a conventional gate valve may be engulfed in flames which may heat the valve to temperatures approaching 2000° F. (1100° C.). Such extreme heat causes the valve seals, including the stem packing, to deteriorate, and also causes the valve fluids to vaporize. The loss of seals causes external and through leakage. Vaporization of trapped valve fluids creates dangerously high pressures within the valve chamber, which can sometimes accelerate the loss of the deteriorating seals.

Fusible elements have been used in the past for safety valves and the like which are designed to remain open under normal environmental conditions, permitting flow of fluids through the valve, and to close under fire conditions, shutting off such flow.

U.S. Pat. No. 3,842,853 to Kelly et al., for example, discloses a heat responsive safety valve in one embodiment of which the gate is held in open position by an end cap secured to a nipple around the upper end of the stem by a fusible bushing, preventing upward movement of the stem. When the fusible bushing melts, it no longer holds the cap against the stem, and the stem moves upward responsive to a spring load to close the valve. In another embodiment, an outer sleeve is threaded to the nipple, and an inner cap is telescoped within the outer sleeve and prevented from rising with respect thereto by locking balls disposed in ports in the inner cap and a recess in the outer sleeve. A stem holding member is disposed on top of the stem, and a fusible disc is disposed between the upper end of the holding member and the inner cap. The holding member, restrained by the fusible disc, prevents the locking balls from moving inward. Upward movement of the holding member, inner cap and stem is thereby prevented during normal operations, thus holding the gate in open position. When the fusible disc melts, as in a fire, the fusible material is vented through a port in the inner cap and the holding member is allowed to rise. An annular recess in the holding member is allowed to register with the locking balls, permitting them to cam inwardly, releasing the inner cap from the outer sleeve and permitting the holding member, inner cap and stem to rise, closing the valve. In another embodiment, a cap having an internal annular recess is threaded onto the nipple, and a ring of fusible material is disposed in the radially outward end of the recess. A disc carrying a plurality of locking dogs is disposed above the top end of the stem, with the dogs being biased outwardly, partially into the recess and against the fusible ring, by upward stem force against the disc. Under normal conditions, the locking dogs prevent upward movement of the disc, thus holding the stem down and maintaining the valve in open position. In a fire, the fusible ring melts, venting the fusible material through ports in the cap, allowing the dogs to be cammed outwardly completely into the recess in the cap, thereby freeing the disc for upward movement and ejecting it from the cap. The stem is then permitted to rise, closing the valve. In the Kelly device, however, there is no provision for back-up seals in the event the O-ring stem seal deteriorates in the fire, and thus external leakage past the O-ring stem seal may be permitted even though the valve is closed. This is unacceptable in a fire-resistant valve. Moreover, in the Kelly device, the elements holding the stem down under normal operations are free to be forcefully ejected from the valve during a fire, which is extremely hazardous to other equipment and personnel in the vicinity. This is also unacceptable.

Fusible elements have also been used in valves in the past which, under normal environmental conditions, remain integral to allow routine operations of the valve, and under fire conditions become fused to permit creation of a secondary, fire-resistant, typically metal-to-metal seal to prevent loss of fluid through a deteriorating or destroying primary seal.

U.S. Pat. No. 2,647,721 to Volpin discloses a fusible ring around a valve stem between a packing gland and bearing arranged to melt under elevated temperatures to permit the bearing and the stem to move axially upward so that an annular shoulder on the stem engages a corresponding seat in the valve body forming a metal-to-metal seal.

U.S. Pat. No. 3,788,600 to Allen discloses a gate valve with a two-piece stem, the outer section of which telescopes with respect to the inner section. The outer section has a metal sealing shoulder which is held apart from a metal seat in the bonnet cap by a fusible ring. In the event of a fire, the fusible ring melts, allowing the upper stem section to move upwardly so that its sealing shoulder engages the seat in the bonnet cap, forming a metal-to-metal seal.

U.S. Pat. No. 4,082,105 to Allen discloses a valve having annular elements which are held in a distorted position (see FIG. 2 of Allen '105) by means of solder. When the valve is subjected to sufficient heat, the solder melts and the annular elements relax to a position such that their inner edges bite into the valve stem to form a secondary seal, as shown in FIG. 3 of Allen '105.

U.S. Pat. No. 4,214,600 to Williams, Jr. et al. discloses a fusible washer in a valve bonnet cap between an upper stem bearing and the inside end of the cap which during normal operations supports the bearing and valve stem such that a shoulder on the stem is spaced from a corresponding backseat in the bonnet. When the fusible washer is exposed to fire, it melts and is drained outside the valve body. As the fusible washer melts, it no longer supports the bearing and valve stem, permitting the stem shoulder to move into metal-to-metal sealing engagement with the bonnet backseat.

U.S. Pat. No. 4,245,661 to McGee discloses a heat responsive backseat arrangement for a valve stem. An upper stem bearing is supported above by a fusible annular disc with outlet ports provided to allow the fusible material to escape when melted. When the fusible annular disc melts, as in a fire, the valve stem and its bearings are permitted to rise relative to the bonnet, permitting a shoulder on the stem to engage a backseat in the bonnet to form a metal-to-metal seal.

U.S. Pat. No. 4,271,857 to Rowe discloses a valve actuator on a valve bonnet, including a piston stop sleeve supported in a normal position by a fusible ring which provides an upper travel stop for the actuator piston and stem under normal operating conditions, preventing a shoulder on the stem from backseating in the bonnet. When the fusible ring melts, as during a fire, the fusible material is vented through a port and the stop sleeve is allowed to rise, enabling the actuator piston and stem to rise beyond the normal stop position and the stem shoulder to backseat, forming a metal-to-metal seal.

See also, the two above-referenced technical papers wherein there is discussion concerning use of a Cameron gate valve, modified to include a spacer ring of eutectic material beneath the stem bearing which allows metal-to-metal backseating of the stem under fire conditions.

Several problems exist with the prior art devices discussed above that sometimes lead to inadequate performance of the equipment under fire conditions. In addition to the drawbacks with the approach taken in the Kelly patent, discussed supra, the relatively large volume of fusible material utilized in the prior art fusible elements leads to a slower reaction time of the fusible elements during a fire, when rapid response of the devices is extremely critical to ward off worsening or proliferation of the fire. Moreover, the fusible elements are located in a position such that heat conduction to the fusible elements is relatively poor, further slowing reaction time. In addition, the relatively large volume of fusible material utilized in the fusible elements often necessitates providing special relief holes in the valve for venting the fused material. In the event such a relief hole were to become plugged, the device may not operate or, if it does, it may not do so quickly enough. The fusible material may re-solidify in the bearings, rendering the valve inoperable. Further, especially with the devices designed to create a secondary metal-to-metal backup seal for a deteriorating or destroyed primary seal, it is not readily apparent to an observer whether or not the fusible material has been melted by the fire, and thus whether refitting of the bonnet is necessary.

It is an object of the present invention to provide a fire responsive stem retention apparatus utilizing fusible materials for a fire resistant, non-rising stem valve which under normal environmental conditions allows routine operation of the valve with no backseating of the valve stem, and under fire conditions permits backseating of the valve stem in the bonnet, creating a secondary, metal-to-metal or other fire resistant seal, as of compacted graphite, as a backup for the primary stem seal, and which overcomes the above-described problems associated with prior art devices. The fire responsive stem retention apparatus of the present invention is designed for reliable, more rapid response to fire conditions through the use of a smaller volume of fusible material than in prior art devices, and more intimate contact between the fusible material and the portions of the valve exposed to the fire, resulting in improved heat conduction to the fusible material. In using a smaller volume of fusible material, the apparatus of the present invention does not require special relief holes to vent the fusible material when melted, nor can the fusible material foul the bearing or solder the stem to the bonnet. The apparatus of the present invention also provides a ready external visual indication of the status of the fusible material, and, therefore, of whether or not refitting of the bonnet is necessary. It is also an object of the present invention to provide such a fire responsive stem retention apparatus for an otherwise fire resistant valve enabling it to successfully pass the fire tests set out in the API RP6F and API RP6F-"Improved" procedures.

Other objects and advantages of the present invention will become apparent from the following detailed description.

SUMMARY OF THE INVENTION

In accordance with the preferred embodiment of the present invention, a fire responsive stem retention apparatus includes an outer hollow sleeve secured to the top of a bonnet around a valve stem. An inner cap is received in the outer hollow sleeve and closely fitted with respect thereto. Upper and lower stem bearings, with a bearing keeper therebetween, are housed in the inner cap around the stem. The inner cap has a shoulder which provides an upper support for the upper stem bearing. Under normal environmental conditions, the inner cap is sweated to the outer hollow sleeve with a thin layer of fusible material, such as tinman's solder or the like, with the top of the inner cap being substantially flush with the upper end of the outer hollow sleeve. The upper stem bearing, bearing keeper and stem are prevented from moving upward by the shoulder on the inner cap, and an annular shoulder on the stem is thereby prevented from engaging a backseat in the bonnet. Under fire conditions, the thin layer of fusible material between the inner cap and outer hollow sleeve melts rapidly, due to its small volume and its intimate contact with both the inner cap and outer hollow sleeve. When the fusible material melts, the inner cap is free to move upwardly, and the upper bearing, bearing keeper and stem are no longer supported from above by the shoulder on the inner cap. Thus, the upper bearing, bearing keeper and stem move upwardly by internal valve pressure until the shoulder on the stem seats against the backseat in the bonnet, creating a fire resistant secondary seal for the stem and preventing leakage of fluids past the stem to the outside. A screw protruding outwardly from the wall of the inner cap rides in a slot in the outer hollow sleeve to prevent the inner cap from being forced completely out of the upper end of the outer sleeve. The position of the screw in the slot, and the relationship between the upper ends of the inner cap and outer hollow sleeve, provide a ready visual indication of whether or not the fusible material has melted.

BRIEF DESCRIPTION OF THE DRAWINGS

For a detailed description of a preferred embodiment of the present invention, reference will now be made to the accompanying drawings wherein.

DETAILED DESCRIPTION OF THE PREFERRED EMBODIMENT

Figure 1:
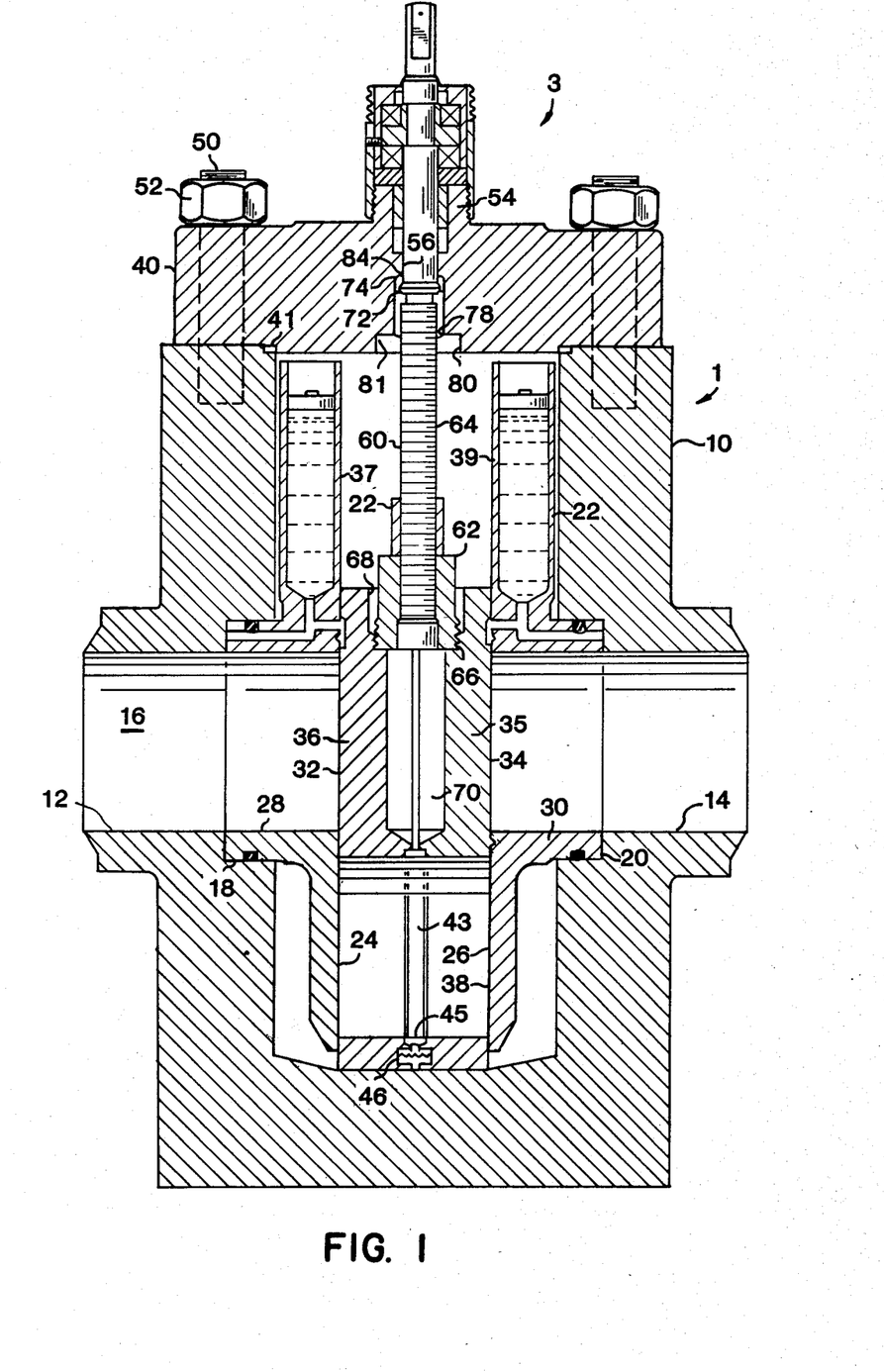
FIG. 1 is a vertical sectional view of a valve incorporating the fire responsive stem retention apparatus of the present invention.

Referring initially to FIG. 1, there is shown a through-conduit, non-rising stem gate valve 1 incorporating the fire responsive stem retention apparatus 3 of the present invention. Valve 1 includes a valve body or housing 10 having opposed flow ports 12, 14 forming a flow way 16 through which line fluids may pass. Valve body 10 may be machined from a steel block, for example as is shown in FIG. 1, but suitable castings or forgings may be useful for some applications. Body 10 may be composed of 4130 steel, for example. As illustrated, flow port 12 is the upstream or inlet end of the valve and flow port 14 is the downstream or outlet end. The interior ends of the flow ports 12, 14 are provided with coaxial counterbores 18, 20, respectively, which circumscribe flow ports 12, 14.

A gate chamber 22 intersects flow way 16 within housing 10, generally at a right angle with respect thereto. Gate chamber 22 and flow port counterbores 18, 20 are adapted to receive a pair of opposed seats 24, 26. Each seat 24, 26 has an outwardly facing surface shaped substantially complimentarily to the shape of counterbores 18, 20 and gate chamber 22. Seats 24, 26 each include a neck or hub 28, 30 received by counterbore 18, 20, respectively. Each seat 24, 26 is provided with a transverse opening coaxial with, and registering with, flow ports 12, 14 and flow way 16, and generally of the same diameter. The inwardly facing surface of each seat member 24, 26 is shaped to cooperate in sliding engagement with the exterior abutting face of a gate segment 32 or 34 as will be described hereinafter.

The seats 24, 26 and their appurtenances are identical in construction and arranged symmetrically on opposite sides of gate chamber 22 so that the description of one will be applicable to the other.

A gate 36 between seats 24, 26 forms a closure member for selectively closing off and opening communication between the upstream and downstream flow ports 12, 14. Gate 36 is preferably constructed as a pair of mating gate segments 32, 34 disposed between seats 24, 26 within gate chamber 22 for reciprocation across flow way 16. Gate segments 32, 34 and seats 24, 26 may be made of 410 stainless steel, for example. Gate segments 32, 34 of gate 36 are provided near their upper ends with a closure section 35 adapted to prevent fluid flow through flow way 16 when the gate is lowered to the closed position as illustrated in FIG. 1, and ports 38 near their lower ends adapted to permit such flow when the gate is raised to open position. Sealing material to provide a seal between seat hubs 28, 30 and counterbores 18, 20, and between gate segments 32, 34 and seats 24, 26, is provided from reservoirs 37, 39 in a manner well known in the art, as shown for example in U.S. Pat. No. 2,657,898 to Volpin. In addition, the abutting surfaces of the gate segments and seats may be lapped to ensure that a dry, sealant free seal therebetween is possible in the event of sealant loss or failure in a fire. A trash ring 43, which may be composed of 302 stainless steel, for example, is disposed between gate segments 32, 34 around ports 38, and a plurality of springs 45 disposed in transverse blind bores 46 in the upper and lower ends and middle of gate segments 32, 34 bias the gate segments outwardly, away from each other and toward seats 24, 26, respectively.

The upper end of the gate chamber 22 within housing 10 is closed by a wall comprising a bonnet 40, and the fire responsive stem retention apparatus 3 of the present invention, which is described more fully below. Bonnet 40, which may be composed of 4130 steel, for example, is secured to housing 10 by means such as studs 50 and nuts 52, which are preferably made of material having a high tensile strength under extreme heat, such as Inconel 718 or 660 stainless steel, for example. Bonnet 40 includes an upwardly projecting threaded hub 54 for engagement with the threads on the lower portion of fire responsive stem retention apparatus or bonnet cap 3. A bonnet gasket 41, which may be a spiral wound gasket of Inconel 718 and graphite, for example, is disposed between and seals against bonnet 40 and housing 10.

Gate 36 is mounted for reciprocation between seats 24, 26 by stem 60 and stem nut 62. Stem 60 may be made of K-monel or other suitable material. Nut 62 threadingly engages the exterior threads 64 on stem 60, and is attached to the top portions of gate segments 32, 34, as by threads 66 within threaded recesses 68. Nut 62 may be made of 4130 steel or other suitable material. Upon rotation of stem 60, stem nut 62 with gate 36 attached thereto is raised or lowered within gate chamber 22 to open or close the valve. Gate segments 32, 34 form an interior chamber 70 to receive stem 60 as gate 36 is raised to the open position.

Bonnet 40 has an axial bore 56 through which stem 60 extends. Stem 60 has an annular backseat flange 72 extending radially outwardly from and integral with stem 60 above exterior threads 64. Backseat flange 72 has an upwardly facing annular frustoconical shoulder 74 on its upper side.

Axial bore 56 includes a counterbore 78 large enough in diameter to receive backseat flange 72 therewithin, and a larger counterbore 80 below counterbore 78. Counterbore 80 has a diameter greater than the outer diameter of nut 62. Counterbore 78 terminates at its upper end in an internal, downwardly facing, frustoconical shoulder or backseat 84. A stop sleeve 82, which has an outer diameter smaller than the diameter of counterbore 78, is disposed on stem 60 above nut 62. Stop sleeve 82 may be made of 4130 steel or other suitable material. When gate 36 is raised to open the valve, stop sleeve 82 is received in counterbore 78 and abuts the underside of backseat flange 72 when the valve is fully open, thereby providing an upper travel limit for nut 62 and gate 36. With the valve in the fully open position, nut 62 is received in larger counterbore 80 and is spaced a sufficient distance from the upper end 81 of counterbore 80 to permit stem 60 to rise, and backseat flange 72 to engage backseat 84, when the valve is subjected to a fire and the fire responsive stem retention apparatus or bonnet cap 3 of the present invention is actuated in response thereto, as is described below. Such backseating is also permitted under fire conditions when the gate is in its fully closed or lowered position, or in any position between fully opened or raised and fully closed or lowered. Thus, backseating of flange 72 on backseat 84 is permitted under fire conditions no matter what position the gate happens to be in when the fire occurs.

Figure 2:
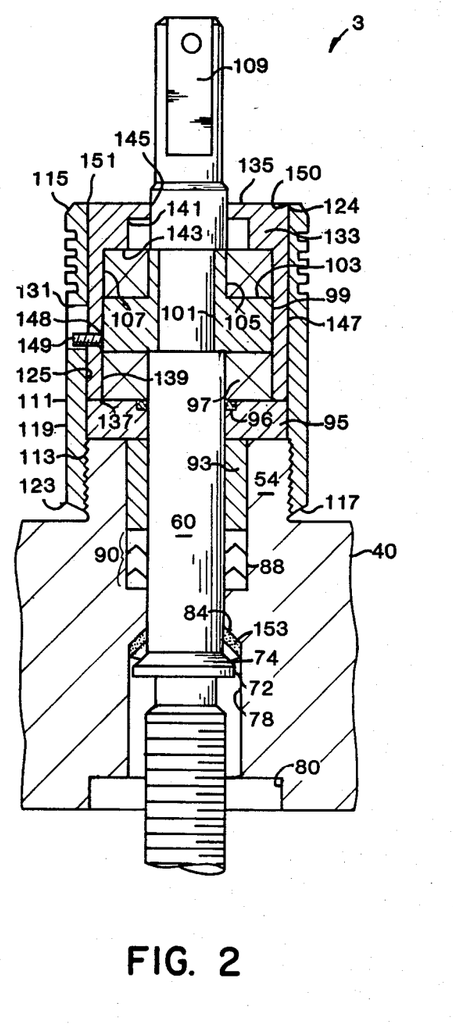
FIG. 2 is an enlarged, vertical sectional view of the fire responsive stem retention apparatus of the present invention, with its components and the valve stem and bearings in their respective positions when the valve shown in FIG. 1 is operated under normal environmental conditions.
Figure 3:
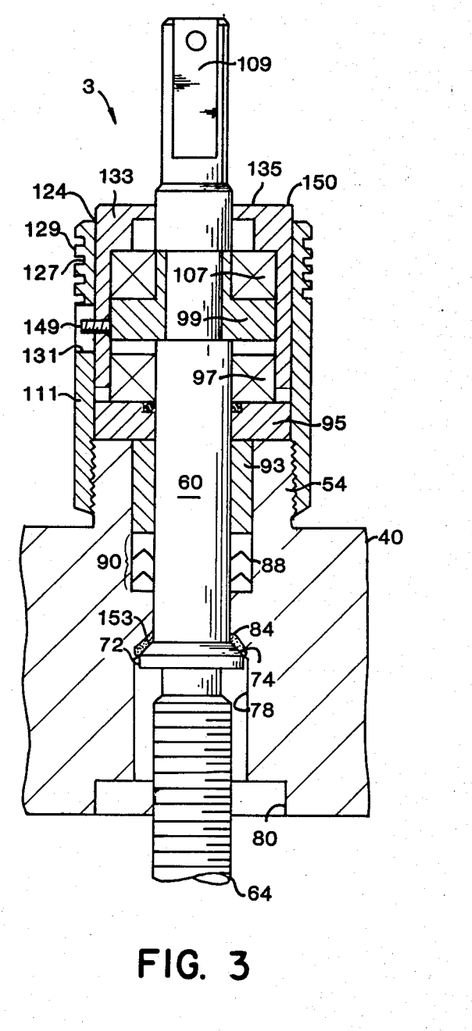
FIG. 3 is an enlarged, vertical sectional view of the fire responsive stem retention apparatus of the present invention, with its components and the valve stem and bearings in their respective positions when the valve shown in FIG. 1 is subjected to a fire.

Referring now to FIGS. 2 and 3, the uppermost portion of the valve shown in FIG. 1, and the fire responsive stem retention apparatus or bonnet cap 3 of the present invention, will be described. As shown, the upper end of stem 60 above backseat flange 72 extends through a stuffing box 88 in bonnet 40 and bonnet hub 54. The stuffing box contains a set of packing rings 90 therein and around stem 60, which serves as the primary seal between stem 60 and bonnet 40. A packing adapter ring 93 is housed in stuffing box 88 around stem 60, above and in engagement with packing ring set 90. A packing retainer washer 95 is disposed on the upper ends of bonnet hub 54 and packing adapter ring 93, around stem 60. Seal ring 96, which may be a Pioneer Nu-Lip quad ring, for example, is disposed around stem 60 in an annular groove in the upper surface of packing retainer washer 95.

A lower stem bearing 97 is disposed on top of packing retainer washer 95, around stem 60. A split bearing keeper or bushing 99 is disposed on top of lower stem bearing 97, around a reduced diameter portion or groove 101 of stem 60. Bearing keeper 99 is prevented from axial movement on stem 60 by the upper and lower annular surfaces of groove 101. Bearing keeper 99 includes a lower flanged portion 103 and an upwardly extending neck portion 105 above flanged portion 103. An upper stem bearing 107 rests on flanged portion 103, around neck portion 105 of bearing keeper 99. Seal ring 96 protects the bearings from possibly corrosive well fluids and retains grease in the bearings. The upper end of stem 60 is provided with flats 109 or other suitable means for engagement by a hand wheel, a wrench, or other valve operator.

The fire responsive stem retention apparatus or bonnet cap 3 of the present invention includes an outer hollow sleeve 111 secured to bonnet hub 54, as by threads 113 on the lower inside surface of sleeve 111 engaging the exterior threads on hub 54. Outer hollow sleeve 111 is generally cylindrical in configuration, having open upper and lower ends 115, 117, respectively, and side wall 119. Sleeve 111 may be made of the same material as valve body 10, e.g. 4130 steel or the like. Side wall 119 is beveled on its outside edges at 121, 123 near upper and lower ends 115, 117, respectively, and at 124 on its inside upper edge. Between threads 113 and upper end 115, side wall 119 of sleeve 111 has a smooth inner surface 125. Sleeve 111 also includes a plurality of annular grooves 127 in the upper outer surface of side wall 119 near upper end 115, forming a plurality of ribs 129 therebetween. Below ribs 129, sleeve 111 has an axially elongate slot 131, which may be oval shaped or rectangular in configuration, for example, through side wall 119.

Fire responsive stem retention apparatus or bonnet cap 3 further includes an inner cap 133 received in outer hollow sleeve 111. Inner cap 133 is generally of hollow cylindrical configuration having a closed upper end or top 135 and an open lower end 137. Inner cap 133 may also be made of the same material as valve body 10, such as 4130 steel or other suitable material. Inner cap 133 has a lower internal bore 139, an intermediate reduced diameter bore 141 above bore 139 forming shoulder 143 therebetween, and an upper, further reduced central bore or aperture 145 in top 135 through which stem 60 extends. Inner cap 133 has a smooth outer cylindrical side wall 147 which is closely, but not tightly, fitted within bore 125 of sleeve 111. For example, the inside diameter of bore 125 of sleeve 111 may be about 2.642 inches, with a tolerance of plus 0.003 inches, and the outside diameter of cap 133 may be about 2.637 inches, with a tolerance of minus 0.002 inches. Thus, the radial clearance between inner cap 133 and outer sleeve 111 may be, for example, of the order of 0.005 to 0.010 inches. It is to be understood that such dimensions are illustrative only, and not limiting. The upper outside edge of side wall 147 is beveled, as shown at 150. A screw 149, which may also be a grease fitting, is disposed in a threaded transverse bore 148 in side wall 147 and protrudes radially outwardly from inner cap 133 and rides in slot 131 of outer sleeve 111.

Under normal environmental conditions, inner cap 133 will be positioned as shown in FIG. 2, with its top 135 substantially flush with the upper end 115 of outer sleeve 111, and its lower end 137 disposed on top of packing retainer washer 95. Screw or grease fitting 149 will be disposed at the lower end of slot 131. The upper bearing 107 will be engaged on its upper surface by shoulder 143 of cap 133. In this position, inner cap 133 is sweated to outer sleeve 111 with a thin layer, e.g. of the order of 0.005 to 0.010 inches in radial thickness, of fusible material 151 extending along substantially the whole joint between inner cap 133 and outer sleeve 111, in order to give the joint the strength necessary to withstand stem force at body test pressure (twice working pressure) without shearing. With the inner cap 133 and outer sleeve 111 thus joined together by a thin layer of fusible material 151, under normal environmental conditions, upper bearing 107, bearing keeper 99 and stem 60 are prevented from moving upwardly by shoulder 143 of inner cap 133. Therefore, backseat flange 72 on stem 60 is prevented from engaging backseat 84 in bonnet 40 under such normal environmental conditions.

Fusible material 151 may be made of any suitable low melting point materials, such as alloys of bismuth, antimony, tin, lead, or zinc, many of which are well known in the art and need not be described here. Such fusible materials should be such as to substantially retain their strength at ordinary operating temperatures, i.e., under normal environmental conditions, even in situations where the valve may be exposed to the sun in desert locations. Thus, fusible material 151 will possess good strength properties up to 100° C. One fusible material which works satisfactorily is a soft tinman's solder made of a maximum of 95.5% tin, a maximum of 5.25% antimony and a maximum of 0.07% lead, which has good strength characteristics up to 200° C. and is completely liquid at 243° C.

When the valve 1 is subjected to a fire, the extreme heat from the fire is conducted through side wall 119 of outer sleeve 111 and top 135 of inner cap 133 to the thin layer of fusible material 151. Conduction of heat through side wall 119 is aided by grooves 127 and ribs 129, which increase the surface area exposed to the fire and reduce the wall thickness at the inner ends of the grooves. Heat from the fire also contacts fusible material 151 directly, between upper end 115 of sleeve 111 and top 135 of inner cap 133. The small volume of the thin layer of fusible material 151 sweated into the joint between inner cap 133 and outer sleeve 111, which is in intimate contact with both the inner cap and outer sleeve all along the sweated joint, reaches its fusion point extremely rapidly and melts, prior to deterioration of seal 90 sufficient to cause leakage therefrom, thereby freeing inner cap 133 from outer sleeve 111. When the thin layer of fusible material 151 is sufficiently melted, internal valve pressure forces stem 60 upward, forcing bearing keeper 99, upper bearing 107 and inner cap 133 upward along with it, until backseat flange 72 engages backseat 84. The respective positions of the stem, inner cap, bearing keeper and upper bearing under fire conditions are shown in FIG. 3. When backseat flange 72 engages backseat 84, a secondary seal is created which prevents fluids from escaping between stem 60 and bonnet 40 in the event primary seal 90 ultimately deteriorates or is destroyed in the fire. Inner cap 133 is prevented from being forced or blown completely out of outer sleeve 111 by engagement of screw or grease fitting 149 with the upper end of slot 131.

The backseating of the stem flange 72 on backseat 84 may form a fire resistant metal-to-metal seal, for example, as by direct engagement of flange 72 on backseat 84, or it may form a fire resistant seal by means of a suitable seal member interposed between flange 72 and backseat 84. Such a seal member may be, for example, a ring 153 of compacted graphite carried on backseat 84 of bonnet 40 and which is compressed between flange 72 and backseat 84 into sealing engagement with stem 60 and bonnet 40 when stem 60 moves upwardly after melting of fusible material 151.

The small volume of the thin layer of fusible material 151 utilized to hold inner cap 133 to outer sleeve 111 under normal operating conditions not only responds by melting extremely rapidly during a fire, but also does not require any special relief holes through which it must pass when melted in order for the inner cap to move freely to its upper position. Also, the positions of screw 149 raised in slot 131 and of top 135 of inner cap 133 raised above end 115 of sleeve 111 provide a ready external visual indication that fusible material 151 has melted and, therefore, that refitting of the bonnet is necessary after the fire.

The fire responsive stem retention apparatus of the present invention may be viewed as a fire responsive safety device having a normal operating state illustrated in FIGS. 1 and 2, corresponding to operation under normal environmental conditions, and an emergency safe state illustrated in FIG. 3, corresponding to operation under fire conditions. In the normal operating state, the outer cylindrical surface of inner cap 133 is bonded to the inner cylindrical surface of outer sleeve 111 by the thin layer of fusible material 151. When the outer surface is exposed to a fire, it conducts heat to the thin layer of fusible material, causing it to melt, and permitting the safety device to assume the emergency safe state of FIG. 3 through relative motion of the inner cap and outer sleeve.

Because many varying and different embodiments may be made within the scope of the invention concept herein taught, and because many modifications may be made in the embodiments herein detailed, it should be understood that the details described herein are to be interpreted as illustrative and not in a limiting sense.

For example, the preferred embodiment of the present invention has particular utility with respect to retaining a stem in a non-rising stem valve in its normal operating state with the valve stem's backseat flange spaced from the valve's bonnet backseat and allowing the backseating of the stem when a fire occurs, and accordingly has been described in detail with respect thereto. It should be understood, however, that the present invention may be used with any other apparatus which employs an operating stem passing through a pressure vessel wall and subject to a fire, wherein it is desired to retain the stem in a normal operating state under normal environmental operating conditions and cause it to move to an emergency safe state under fire conditions. The present invention may be used, for example, with rams for a tubing head or blowout preventer on a Christmas tree.

We claim:

1. A fire responsive stem retention apparatus for a valve having a valve body with a flow passage therethrough and an open upper end, a valve chamber intersecting the flow passage within the valve body, a bonnet closing the upper end of the valve body with a bore therethrough and an annular backseat in the bore, a stem within the valve chamber and extending through the bonnet bore above the bonnet, bearing means mounted on the stem above the bonnet, stem packing means in the bonnet around the stem, a gate mounted on the stem within the valve chamber for movement up and down the stem for reciprocation across the flow passage to alternately open and close the flow passage upon rotation of the stem, and a backseat flange on the stem within the bonnet bore in spaced relationship with the bonnet backseat under normal environmental conditions, comprising:

an outer hollow sleeve fixedly mounted on top of the bonnet around the stem;

an inner cap disposed around the bearing means and received within said sleeve in close fitted relationship therewith, said inner cap having a shoulder engaging the upper surface of the bearing means, said inner cap being connected to said outer sleeve under such normal environmental conditions by a thin layer of fusible material between said inner cap and outer sleeve, said connection preventing upward movement of said inner cap within said sleeve thereby preventing upward movement of the bearing means and stem and maintaining the backseat flange on the stem in spaced relationship with the bonnet backseat;

said thin layer of fusible material being melted in response to extreme heat, as under fire conditions, releasing said inner cap from said outer sleeve and allowing upward movement of said cap within said sleeve, thereby permitting upward movement of the bearing means and stem and sealing engagement of the backseat flange on the stem with the bonnet backseat for establishing a secondary fire resistant seal as a backup seal for the stem packing means.

2. Fire responsive stem retention apparatus according to claim 1, wherein said outer sleeve includes a plurality of grooves in its upper outer side surface forming a plurality of ribs therebetween, substantially adjacent said thin layer of fusible material.

3. Fire responsive stem retention apparatus according to claim 1, wherein said outer sleeve includes a slot through its side wall, and said inner cap includes an outwardly extending pin in its side wall, riding in said slot.

4. A fire responsive stem retention apparatus for a non-rising stem valve having a bonnet with a bore therethrough, a backseat in the bonnet bore, a stem extending through the bonnet bore and above the bonnet, bearing means mounted on the stem above the bonnet, and a backseat flange on the stem below the bonnet backseat and spaced therefrom under ordinary operating temperatures, comprising:

a hollow sleeve connected to the top of the bonnet around the bonnet bore and extending upwardly therefrom around the stem, said sleeve having an internal bore and an open upper end;

inner cap means having a side wall portion closely fitted within the internal bore of said sleeve and connected thereto under such ordinary operating temperatures by a thin layer of fusible material between the outside surface of said side wall portion of said inner cap means and the wall of said internal bore of said sleeve, and a top portion connected to said side wall portion above and in engagement with the bearing means, partially closing said upper end of said sleeve, for providing an upper support for and preventing upward movement of the bearing means and stem under such ordinary operating temperatures and supporting the backseat flange below and spaced from the bonnet backseat;

said thin layer of fusible material being melted when the valve is subjected to elevated temperatures, as in a fire, releasing the connection between said inner cap means and outer sleeve and removing the upper support for the bearing means and stem, thereby permitting the bearing means and stem to be moved upwardly by internal valve pressure until the backseat flange sealingly engages the bonnet backseat.

5. Fire responsive stem retention apparatus according to claim 4, wherein said sleeve has a side wall, and includes means on the outer surface of said side wall of said sleeve for enhancing conduction of heat through said side wall of said sleeve to said thin layer of fusible material.

6. Fire responsive stem retention apparatus according to claim 5, wherein said heat conduction enhancing means includes a plurality of annular grooves forming a plurality of ribs therebetween.

7. Fire responsive stem retention apparatus according to claim 4, wherein said inner cap means includes means engageable with correlatively shaped means in said sleeve for preventing removal of said inner cap means from said sleeve when said thin layer of fusible material has been melted.

8. Fire responsive stem retention apparatus according to claim 7, wherein under ordinary operating temperatures said inner cap means is positioned with the upper surface of said top portion of said inner cap means substantially flush with said upper end of said sleeve, and when said thin layer of fusible material melts under such fire conditions, said inner cap means is forced upwardly by the stem and bearing means such that the upper surface of said top portion of said inner cap means is spaced above said upper end of said sleeve.

9. Fire responsive stem retention apparatus according to claim 8, wherein said means for preventing removal of said inner cap means from said sleeve includes a pin in one of said inner cap means and sleeve which rides in a slot in the other of said inner cap means and sleeve.

10. Fire responsive stem retention apparatus according to claim 4, wherein:

said sleeve includes a plurality of grooves in its outer side surface forming a plurality of ribs therebetween for enhancing conduction of heat through said sleeve to said thin layer of fusible material, and an axially elongate slot through said sleeve below said grooves and ribs; and said inner cap means includes a retaining screw projecting radially outwardly therefrom and riding in said slot in said sleeve.

11. Fire responsive stem retention apparatus according to claim 10, wherein said thin layer of fusible material is of the order of between 0.005 and 0.010 inches in radial thickness.

12. Fire responsive stem retention apparatus according to claim 11, wherein said thin layer of fusible material comprises a material which will possess good strength properties up to 100° C.

13. Fire responsive stem retention apparatus according to claim 12, wherein said thin layer of fusible material comprises a maximum of 95.5% tin, a maximum of 5.25% antimony, and a maximum of 0.07% lead.

14. A fire responsive safety device having a normal operating state under normal environmental conditions and an emergency safe state under fire conditions, comprising:

an outer member with a cylindrical inner surface;

an inner member with a cylindrical outer surface, said inner member being received within said outer member;

a thin layer of fusible material disposed between and normally bonding said outer surface of said inner member to said inner surface of said outer member in a position corresponding to the normal operating state;

said outer member, when exposed to fire, conducting heat to said fusible material, causing it to melt, and permitting the safety device to assume the emergency safe state through relative motion of said inner and outer members;

said inner member including means engageable with said outer member for preventing removal of said inner member from said outer member when said fusible material has been melted, said means engageable with said outer member including a slot through the side wall of said outer member, and an outwardly extending pin in the side wall of said inner member, riding in said slot.

15. Fire responsive safety device according to claim 14, wherein said outer member includes means on the outer surface of said side wall for enhancing conduction of heat to said fusible material when exposed to fire.

16. Fire responsive safety device according to claim 15, wherein said outer member includes a plurality of grooves on the outer surface of said side wall forming a plurality of ribs therebetween.

* * * * *

UNITED STATES PATENT AND TRADEMARK OFFICE
CERTIFICATE OF CORRECTION

PATENT NO. : 4,540,013
DATED : SEPT. 10, 1985
INVENTOR(S) : RICHARD G. FURLEY; JOHN H. FOWLER

It is certified that error appears in the above—identified patent and that said Letters Patent is hereby corrected as shown below:

Column 3, line 24: delete "destroying" and insert --destroyed--.

Column 10, line 40: delete "surface" and insert --sleeve--.

Signed and Sealed this

Thirty-first Day of December 1985

[SEAL]

Attest:

DONALD J. QUIGG

Attesting Officer

Commissioner of Patents and Trademarks